(12) United States Patent
Kotani

(10) Patent No.: US 6,917,782 B2
(45) Date of Patent: Jul. 12, 2005

(54) ORIGINAL DOCUMENT IMAGE SCANNING AND PRINTING DEVICE

(75) Inventor: Masaki Kotani, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/738,225

(22) Filed: Dec. 17, 2003

(65) Prior Publication Data
US 2004/0145782 A1 Jul. 29, 2004

(30) Foreign Application Priority Data
Jan. 27, 2003 (JP) .......................... 2003-017155

(51) Int. Cl.⁷ ............................................... G03G 15/00
(52) U.S. Cl. ...................................... 399/363; 399/364
(58) Field of Search .............................. 399/363, 364, 399/140, 361; 358/474, 486, 448–453

(56) References Cited

U.S. PATENT DOCUMENTS

| | | | | |
|---|---|---|---|---|
| 5,438,436 A | * | 8/1995 | Harris | 358/500 |
| 5,530,560 A | * | 6/1996 | Nakajima | 358/453 |
| 5,694,486 A | * | 12/1997 | Shigeeda et al. | 382/197 |
| 6,168,327 B1 | * | 1/2001 | Tsuzuki | 400/188 |
| 6,263,118 B1 | * | 7/2001 | Kanno et al. | 382/289 |
| 6,408,094 B1 | * | 6/2002 | Mirzaoff et al. | 382/224 |
| 6,427,032 B1 | * | 7/2002 | Irons et al. | 382/306 |

FOREIGN PATENT DOCUMENTS

| | | |
|---|---|---|
| JP | 07-050749 | 2/1995 |
| JP | 09-270883 | 10/1997 |
| JP | 2000-165653 | 6/2000 |

* cited by examiner

*Primary Examiner*—Anthony H. Nguyen
(74) *Attorney, Agent, or Firm*—Hogan & Hartson, LLP (57) ABSTRACT

An original document image scanning and printing device includes a scanning unit that scans an image of an original document, a printing unit that prints out the image, an image processing unit that rotates the image and a control unit that controls rotating and scanning the image in preference to rotating and printing the image when it is necessary to rotate the image scanned by the scanning unit.

17 Claims, 4 Drawing Sheets

ORIGINAL DOCUMENT IMAGE SCANNING AND PRINTING DEVICE

BACKGROUND OF THE INVENTION

1. Field of the Invention

The present invention relates to an original document image scanning and printing device having an image rotating function.

2. Description of Related Art

In general, to rotate an image by 90 degrees, a direction in which the image is written and a direction in which the image is retrieved changes. To carry out such a process, it is necessary to store the image once in memory. However, a large capacity of memory becomes necessary for storing the image. In an inexpensive device, to suppress an increase in the costs, there are many cases where the device only has minimum memory. There is a device having a memory that can only store an image of approximately one page for the rotation process.

Meanwhile, in an original document image scanning and printing device such as a facsimile machine or a multifunction peripheral that has a scanning function for scanning an image of an original document and a printing function for printing out the image, an improvement in the functions of the device is attempted even for an inexpensive device. For example, there exists an original scanning and printing device having a function for rotating an image by 90 degrees, that rotates the image scanned from an original document and prints out the image when necessary.

Furthermore, there exists a device that has a facsimile communication function and an input/output function in relation to a remote computer, and can execute a scanning function and a printing function in parallel with one another. In addition, in such a device, there exists a device that can carry out the rotation process when the scanning function has been executed or carry out the rotation process when the printing function has been executed.

However, as described above, in the device that can carry out the rotation process on an image of approximately one page, if the rotation process becomes necessary both for the scanning function and the printing function, the rotation process cannot be carried out at the same time. Therefore, conventionally, the rotation process was carried out preferentially on either the scanning function or the printing function that was executed first, then, until one of the scanning function or the printing function that was executed has been completed, the other function was suspended. Thus, for example, when the scanning process of the original document using the rotation process is attempted during the printing process accompanying the rotation process, a message such as "Please wait for a moment" or "During printing" is displayed, and the scanning process cannot be executed. As a result, it was necessary for a user to wait until the end of the printing process, thus making the operationality of the device low.

SUMMARY OF THE INVENTION

The present invention was made in consideration of the above-described circumstance. An advantage of the present invention is to provide an original document image scanning and printing device that improves operationality for a user when a scanning process and a printing process accompanying a rotation process are executed.

According to the present invention, the original document image scanning and printing device includes a scanning unit that scans an image of an original document, a printing unit that prints out the image, a rotation unit that carries out a rotation process of the image, and a control unit that controls to carry out the rotation process by the rotation unit on the image scanned by the scanning unit in preference to the printing process of the printing unit accompanying the rotation process when it is necessary to rotate the image scanned by the scanning unit. When carrying out the scanning process, there are many cases where a user stands by the device to carry out an operation and waits for the end of the scanning operation. On the contrary, there are many cases where the printing process is executed independently from an existence of the user. The present invention focuses on such an actual usage, and when the rotation unit is used for both the scanning process and the printing process, the scanning process is carried out preferentially. Accordingly, an operationality and satisfaction of the user can be improved.

Further, during the printing process, when it is instructed to start the scanning process or when it is expected for the scanning process to be started, the printing process is interrupted. In this case, when there is a request of the scanning process that requires the rotation process while a duplex printing process is carried out by the printing unit, the printing process is interrupted after completing the printing process onto both sides of a paper that is being printed. Then, it is controlled to execute preferentially, the scanning process of the scanning unit and the rotation process by the rotation unit on the scanned image.

The determination of whether or not the rotation process by the rotation unit is necessary in the scanning process can be carried out in accordance with the size of an original document set at the scanning unit. In general, the size of the original document can be determined prior to the start of the scanning process, and the process for interrupting the printing process can be started prior to the start of the scanning process. As a result, the period of time when the scanning process is on standby can be reduced.

DETAILED DESCRIPTION OF THE PREFERRED EMBODIMENTS

Figure 1:
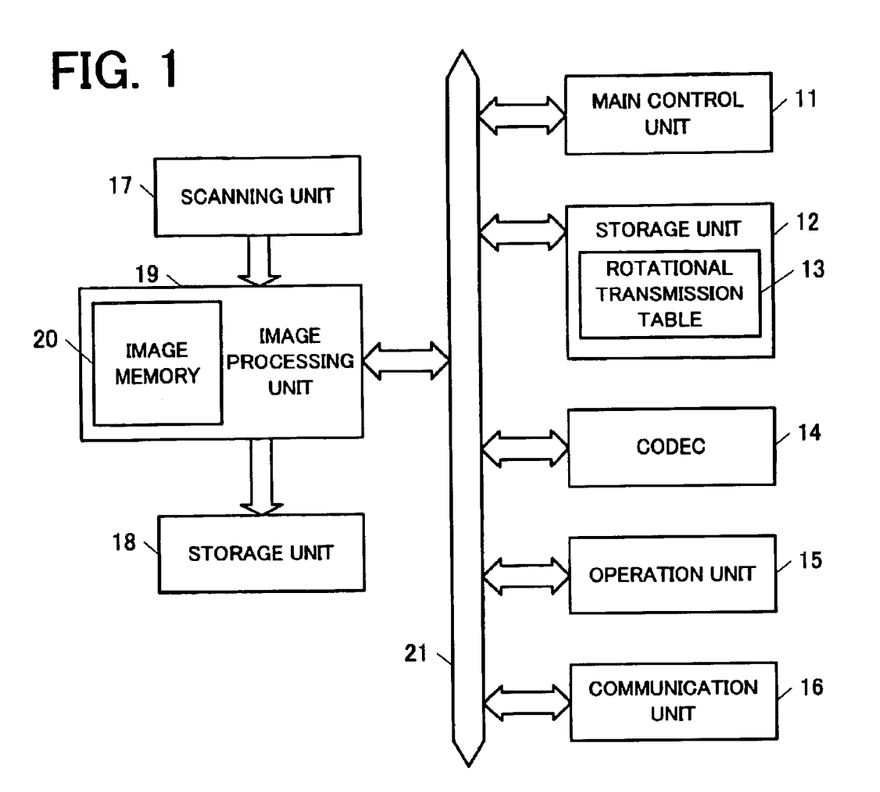
FIG. 1 is a block diagram showing an original document image scanning and printing device according to an embodiment of the present invention.

FIG. 1 is a block diagram showing an original document image scanning and printing device according to an embodiment of the present invention. In the drawing, reference numeral 11 is a main control unit, 12 is a storage unit, 13 is a rotational transmission table, 14 is a codec, 15 is an operation unit, 16 is a communication unit, 17 is a scanning unit, 18 is a printing unit, 19 is an image processing unit, 20 is an image memory, and 21 is a system bus.

The main control unit 11 controls the entire original document image scanning and printing device, and operates each of the units. The main control unit 11 realizes a scanning process of the scanning unit 17, a printing process of the printing unit 18, and a facsimile transmitting and receiving process using the communication unit 16 or the like. By combining these processes, the main control unit 11 can present various functions. For example, an image scanned by the scanning unit 17 can be transmitted by facsimile from the communication unit 16, an image received by facsimile at the communication unit 16 can be printed out by the printing unit 18, or an image scanned by the scanning unit 17 can be printed out by the printing unit 18 to realize copying. Further, the scanning process of the scanning unit 17 and the printing process of the printing unit 18 can be carried out in parallel with one another. For example, while the printing unit 18 is printing out the image received by facsimile or outputting a list of history information, the scanning unit 17 can scan an image to be transmitted by facsimile.

Furthermore, the main control unit 11 controls the image processing unit 19, and when necessary, executes a rotation process on an image scanned by the scanning unit 17 or an image to be printed out by the printing unit 18. In this case, when there is a coexistence of a rotation process on the image scanned by the scanning unit 17 and a rotation process on the image to be printed out by the printing unit 18, the main control unit 11 controls to preferentially execute the rotation process on the image scanned by the scanning unit 17. That is, while the image processing unit 19 is executing the rotation process on the image scanned by the scanning unit 17, the printing process by the printing unit 18 accompanying the rotation process does not start. Moreover, during the printing process of the printing unit 18 accompanying the rotation process, the image processing unit 19 is instructed to start the scanning process of the scanning unit 17 accompanying the rotation process. Alternatively, when the start of the scanning process is expected, the printing process is interrupted, and the scanning process of the scanning unit 17 and the rotation process of the image processing unit 19 on the scanned image are executed preferentially. Further, the scanning process not accompanying the rotation process and the printing process accompanying the rotation process, and the scanning process accompanying the rotation process and the printing process not accompanying the rotation process can be controlled to be carried out in parallel with one another. Of course, the scanning process can be controlled to be carried out preferentially even in case of the above-mentioned combinations.

Further, when interrupting the printing process, for example, in case the printing unit 18 is carrying out a duplex printing process, the main control unit 11 can control to interrupt the printing process after completing the printing process onto both sides of a paper that is being printed. Of course, in case of a single-side printing process, the main control unit 11 controls to interrupt the printing process at the end of one page.

The determination of whether or not the rotation process is necessary in the scanning process for the facsimile transmission can be carried out in the following way: That is, when an original document to be scanned is set to the scanning unit 17, the size of the original document is detected, and based on the size of the original document, a rotational transmission table 13 stored in the storage unit 12 is referenced, and a determination is made as to whether or not the rotation process is necessary. Of course, a determination can be made whether or not the rotation process is necessary according to an instruction of a user from the operation unit 15 or in consideration of the instruction of the user. By determining whether or not to carry out the rotation process when the original document is set, the printing process that is being executed can be interrupted at an earlier stage. Therefore, the user can start the scanning process smoothly without waiting for a long period of time until the printing process is interrupted.

The determination of whether or not the rotation process is necessary in the printing process can be carried out in accordance with the size of the image to be printed out and the size of the paper provided in the printing unit 18. For example, when printing out an image of "A4" size onto a paper of "A4R" size, the main control unit 11 can determine that the rotation process will be carried out. When printing out an image of "A4" size onto a paper of "A4" size, the main control unit 11 can determine that the rotation process will not be carried out. The main control unit 11 can also obtain information regarding the usable paper size from the printing unit 18, and determine the size of the image to be printed out and whether or not the rotation process is necessary.

The storage unit 12 can store various pieces of information, such as program that defines the operation of the main control unit 11, necessary data, an image scanned by the scanning unit 17 to be transmitted by facsimile, an image received by facsimile to be printed out by the printing unit 18, and an image to be copied. Further, when storing an image, the image encoded by the codec 14 can be stored in the storage unit 12 so that more images can be stored. Of course, the image can be stored without being compressed.

Figure 2:
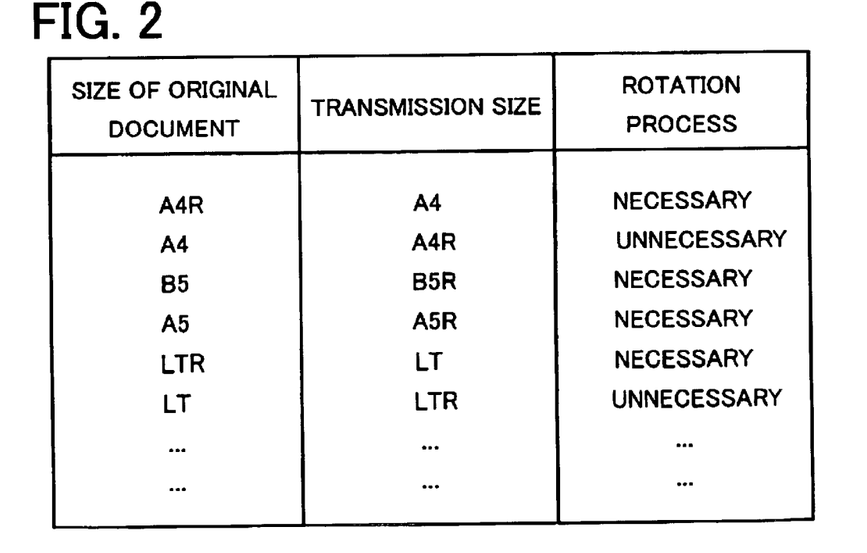
FIG. 2 shows an example of a rotational transmission table.

In addition, the storage unit 12 stores the rotational transmission table 13. As described above, the rotational transmission table 13 is used when determining whether or not to rotate the image scanned by the scanning unit 17 when transmitting the image by facsimile. FIG. 2 shows an example of the rotational transmission table. In this example, the table associates a size of an original document set to the scanning unit 17, a transmission size configured from the operation unit 15 that indicates a size of the image to be transmitted by facsimile, and a determination of whether or not to execute the rotation process. Further, the size which has an "R" at the end of the size of the original document and the transmission size, and the size which does not have an "R" at the end are the same size, but the direction of the papers differ by 90 degrees. For example, if "A4" size is portrait, "A4R" size has the size that is the same as the size of "A4" size but is landscape.

By using the rotational transmission table 13, for example, when the size of the original document is "A4R" and the transmission size is "A4", it is determined to carry out the image rotating transmission. When the size of the original document is "A4" and the transmission size is "A4R", it is determined not to carry out the image rotating transmission. As described above, in this example, by using the rotational transmission table 13, it can be determined easily whether or not to carry out the image rotating transmission in accordance with the size of the original document and the transmission size. Of course, the rotational transmission table 13 shown in FIG. 2 is one example, and the contents or the structure of the table can be determined as appropriate. Further, the rotational transmission table 13 is preferable to be stored in an area in the storage unit 12 that is not erased even if a power source is shut off.

The codec 14 compresses an image to be transmitted via the communication unit 16 in accordance with a prescribed compression method. The codec 14 also decompresses a compressed image received via the communication unit 16 in accordance with a prescribed compression method. Moreover, the codec 14 can compress the scanned image when copying, and decompress the image when printing. Further, the compressing and the decompressing processes can be carried out also by the main control unit 11. The compressing and the decompressing processes can be carried out by the main control unit 11 and the codec 14, or without using the codec 14.

The operation unit 15 includes an input unit, a display unit or the like, and presents various pieces of information to the user and accepts various configurations and instructions from the user. For example, various configurations and an instruction to start the operation for the facsimile transmission or the copy operation can be carried out from the operation unit 15. Of course, various other configurations can be carried out. The determination of whether or not to carry out the rotation process automatically can be set.

The communication unit 16 carries out communication with another communication terminal device or the like through a communication channel such as a public network or a private line, and transmits and receives an image or the like by facsimile.

The scanning unit 17 scans an image of an original document to be transmitted or copied in accordance with the control of the main control unit 11. The scanning method can be any method, and the scanning unit 17 can be formed from various image inputting devices, such as an image scanner or a digital camera. Further, the scanning unit 17 includes a function for detecting a size of an original document. The scanning unit 17 notifies the main control unit 11 with the detected size of the original document. Alternatively, the information of the size of the original document can be referenced from the main control unit 11.

In accordance with the control of the main control unit 11, the printing unit 18 prints out onto a recording paper, an image received via the communication unit 16, a copy image, other history information, or a message to the user or the like. As the printing method, various methods (for example, an electro-photographic method or an inkjet method) can be adopted. Further, the printing unit 18 can carry out a single-side printing process and also a duplex printing process.

The image processing unit 19 can carry out at least the process to rotate the image, and in accordance with the instructions from the main control unit 11, the image processing unit 19 executes the rotation process on the image scanned by the scanning unit 17 and the rotation process of the image to be printed out by the printing unit 18. To execute the rotation process, the image processing unit 19 includes the image memory 20. However, it is assumed that the image processing unit 19 can execute either one of the rotation process of the image scanned by the scanning unit 17 or the rotation process of the image to be printed out by the printing unit 18. Further, when the scanning process does not accompany the rotation process, regardless of whether or not to carry out the rotation process in the printing process by the printing unit 18, the image scanned by the scanning unit 17 can be forwarded via the image processing unit 19 to each of the units. Moreover, when the printing process does not accompany the rotation process, regardless of whether or not to carry out the rotation process on the image scanned by the scanning unit 17, the image to be printed out by the printing unit 18 can be forwarded from each of the units via the image processing unit 19. Further, in FIG. 1, the scanning unit 17 and the printing unit 18 are shown to transfer data through the image processing unit 19. However, the present invention is not limited to this example, and the scanning unit 17 and the printing unit 18 can transfer data directly with another unit.

The system bus 21 connects the main control unit 11, the storage unit 12, the codec 14, the operation unit 15, the communication unit 16 and the image processing unit 19 or the like with one another in a manner that data can be forwarded between each of the units. Of course, other various devices, such as a remote storage device or an interface, can be connected to the system bus 21. For example, a remote interface can be provided, and the remote interface can be connected directly or via the LAN or the like to a remote device such as a computer in a manner that an image and other data can be exchanged with the remote device. In this case, it is possible for the original document image scanning and printing device to not include the communication unit 16.

Figure 3:
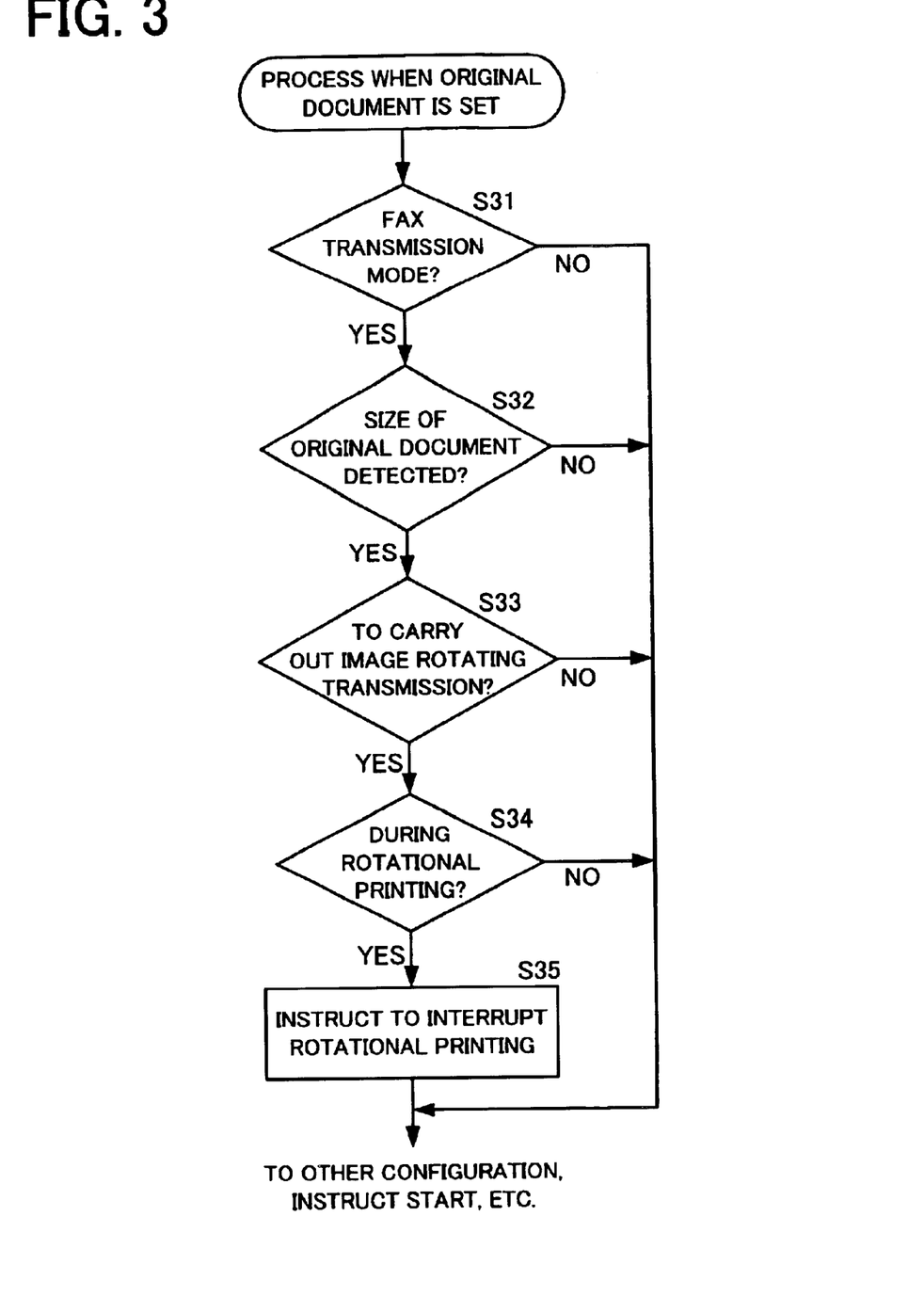
FIG. 3 is a flowchart showing an example of an operation carried out when an original document is set in the image scanning and printing device according to the embodiment of the present invention.

Next, an example of an operation of the original document image scanning and printing device according to an embodiment of the present invention will be described. FIG. 3 is a flowchart showing an example of an operation carried out when an original document is set in the original document image scanning and printing device according to the embodiment of the present invention. When scanning an image of an original document by the scanning unit 17, generally, various configurations are carried out from the operation unit 15, and after an original document is set to the scanning unit 17, the scanning unit 17 is instructed to start the scanning process. In the present invention, when the printing process accompanying the rotation process is being executed, the printing process is controlled to interrupt the printing process at the earliest stage possible. Therefore, when the printing process accompanying the rotation process is being carried out at the time the original document is set to the scanning unit 17, an instruction is made to interrupt the printing process at that time.

In the example shown in FIG. 3 of the process carried out when the original document is set, in case the original document is detected that the original document is set to the scanning unit 17, here, it is determined at step S31 whether or not it is a facsimile transmission mode. For example, in case of a copy mode, since an image can be rotated when printing out the image, it is not necessary to rotate the image at the scanning process. Therefore, here, under the copy mode, the rotation process is not executed in the scanning process. As described above, other than the cases where it is necessary to carry out the rotation process in the scanning process, the determination of whether or not to interrupt the printing process is not carried out when the original document is set.

Here, in case of the facsimile transmission mode, the determination is made as to whether or not to interrupt the printing process. Of course, when the rotation process is designated by another mode, for example, a scanner function, the process can be carried out in the same manner as in the facsimile transmission function.

Next, at step S32, it is determined whether or not the size of the original document has been detected. As described above, it is determined whether or not to carry out the rotation process in accordance with the rotational transmission table (as example is shown in FIG. 2). The determination is carried out based on the size of the original document.

Therefore, when the size of the original document cannot be detected, since the determination of the rotation process cannot be carried out based on the size of the original document, the printing process is not interrupted here.

When the size of the original document is detected, it is determined whether or not to carry out the rotation process in accordance with the rotational transmission table (an example is shown in FIG. 2). In this case, the determination can be carried out by using a default transmission size for the transmission size, or if a transmission size is set prior to the setting of the original document, by using the set transmission size. At step S33, such a determination is carried out, and in case the determination result indicates that the rotation process is unnecessary, the printing process is not interrupted.

When it is determined at step S33 to carry out the rotation process, it is determined at step S34 whether or not the printing process accompanying the rotation process has been carried out. When the printing process has not been carried out, or even when the printing process has been executed, if the printing process does not accompany the rotation process, the printing process is not interrupted. When the printing process accompanying the rotation process has been carried out, at step S35, an instruction is made to interrupt the printing process accompanying the rotation process that is being carried out.

As described above, under the facsimile transmission mode, when it is determined to carry out the rotation process based on the detected image size and the printing process accompanying the rotation process has been carried out, at the time the original document is set, the process to interrupt the printing process starts. It is preferable to interrupt the printing process by units of page or units of sheet. However, there are many cases where a long period of time is taken until interrupting the printing process by such units. As described above, when it is determined that it is necessary to rotate the image at the time the original document is set to the scanning unit 17, by starting the process to interrupt the printing process at this time, the printing process can be interrupted at the earliest possible stage and the scanning process can start.

Prior to or after the operation carried out when the original document is set, the user can carry out various configurations. For example, with respect to the configuration carried out prior to the setting of the original document, the configuration can be considered at the setting of the original document for determining whether or not to carry out the rotation process. For example, when the size of the original document is set manually from the operation unit 15, it can be determined whether or not to carry out the rotation process in accordance with the set size of the original document. It is likewise for the transmission size. When the configuration is carried out from the operation unit 15 after setting the original document, it can be determined whether or not to carry out the rotation process each time the configuration is carried out, or since there are many cases where the configuration by the user is changed, the determination of the rotation process can be suspended until the system is instructed to start the scanning process.

Figure 4:
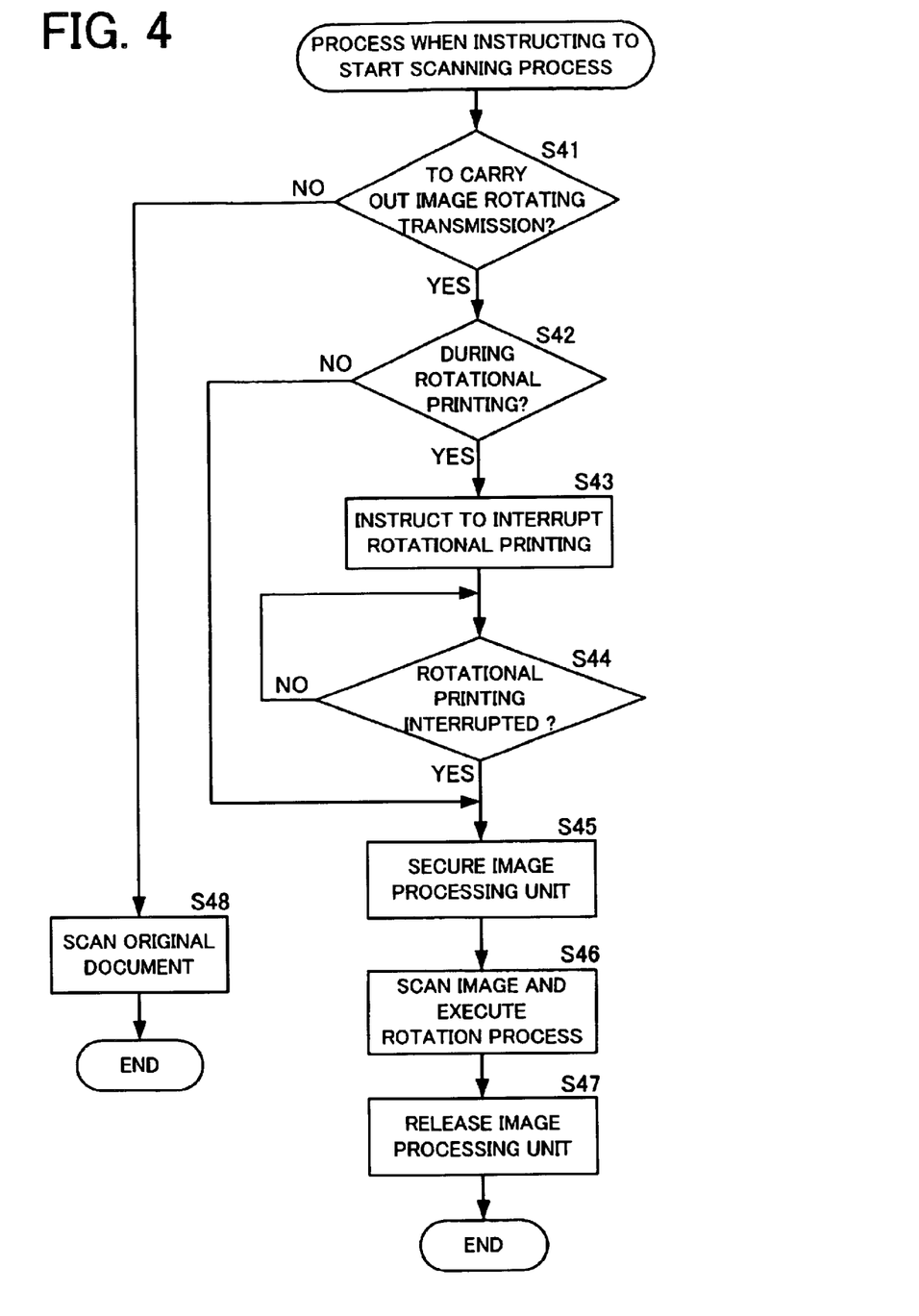
FIG. 4 is a flowchart showing an example of an operation when instructing to start the scanning process in the original document image scanning and printing device according to the embodiment of the present invention.

FIG. 4 is a flowchart showing an example of an operation carried out when an instruction is made to start the scanning process in the original document image scanning and printing device according to an embodiment of the present invention. After various configurations are carried out and the original document is set, when an instruction is made to start the scanning process by an operation of a start button or the like of the operation unit 15, the image of the original document set at the scanning unit 17 is actually scanned.

First, at step S41, it is determined whether or not it is necessary to carry out the rotation process on the scanned image. The determination can be carried out in accordance with the rotational transmission table 13 (an example is shown in FIG. 2). Further, if the determination carried out in step S33 of FIG. 3 has not been changed, the determination can be carried out in accordance with the determination of step S33. Moreover, it can be determined sequentially whether or not to carry out the rotation process during the configuration process, and the determination result can be saved. When the rotation process is not necessary, the image is scanned in step S48. Then, without carrying out the rotation process by the image processing unit 19, the image can be forwarded and stored in the storage unit 12, or after encoding the image by the codec 14, the image can be stored in the storage unit 12 or transmitted from the communication unit 16.

When it is determined that the rotation process is necessary, the image processing unit 19 is used preferentially in the scanning process, and the rotation process has been executed on the scanned image. An step S42, it is determined whether or not the printing process accompanying the rotation process has been carried out. The image processing unit 19 is available when the printing process has not been carried out, or when the printing process not accompanying the rotation process has been carried out, or when the printing process accompanying the rotation process has been interrupted during the process shown in FIG. 3 carried out at the setting of the original document. At step S45, it is assumed that the available image processing unit 19 is used for the scanning process. At step S46, the image of the original document is scanned and the rotation process is executed by the image processing unit 19. The scanned and rotated image is forwarded and stored in the storage unit 12, or after encoded by the codec 14, the scanned and rotated image is stored in the storage unit 12 or transmitted from the communication unit 16.

During the printing process accompanying the rotation process, at step S43, an instruction is made to interrupt the printing process accompanying the rotation process that is being carried out. At step S44, the process goes on standby until the printing process has been interrupted. When the printing process accompanying the rotation process has been interrupted, at step S45, it is assumed that the image processing unit 19 is used for the scanning process. At step S46, the image of the original document is scanned and the rotation process is executed by the image processing unit 19. The scanned and rotated image is forwarded and stored in the storage unit 12, or after encoded by the codec 14, the scanned and rotated image is stored in the storage unit 12 or transmitted from the communication unit 16.

Further, while the image processing unit 19 is used in the scanning process, even when a request for the printing process generates, the printing process is put on standby until the scanning process and the rotation process are completed.

When the scanning process and the rotation process are completed, at step S47, the image processing unit 19 is released, and the image processing unit 19 becomes available for another process. Moreover, when there is an interruption in the printing process, the interruption of the printing process is canceled. The scanning process on the image of the original document is completed as described above. Further, in case of memory transmission, after the scanning process and the rotation process, the process proceeds to a process for transmitting the image from the communication unit 16 to a destination.

Figure 5:
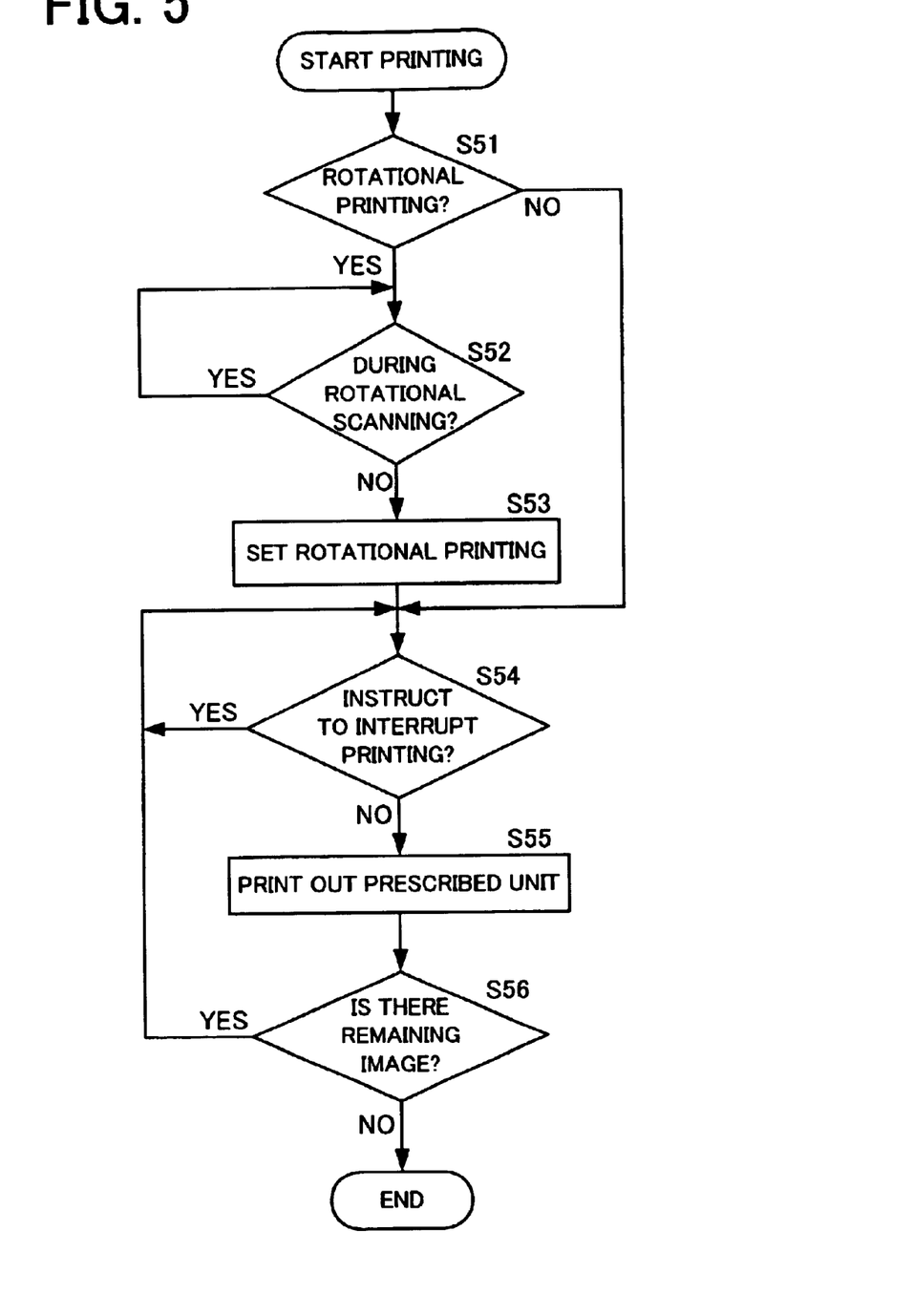
FIG. 5 is a flowchart showing an example of a printing process in the original document image scanning and printing device according to the embodiment of the present invention.

FIG. 5 is a flowchart showing an example of a printing process carried out in the original document image scanning and printing device according to an embodiment of the present invention. When a request for the printing process generates due to various causes, for example, when an image is received by facsimile and there is a request to print out the received image, or when there is a request to print out inside information including a journal or the like, at step S51, the system determines whether or not to carry out the rotation process. The determination can be carried out in accordance with the size of the image and the size of the paper to be used for the printing process by the printing unit 18. For example, when the size of the image is A4 and the A4R size is prepared for the size of the paper, it can be determined to carry out the rotation process and then to print out the image. For the method of determining whether or not to carry out the rotation process, a conventional method can be used.

When carrying out the printing process accompanying the rotation process, at step S52, a determination is made as to whether or not the scanning process accompanying the rotation process has been carried out. When the image processing unit 19 is used in the scanning process and the rotation process has been carried out, the scanning process is carried out preferentially, and the printing process is put on standby until the scanning process has been completed. When the scanning process accompanying the rotation process has been completed, the process proceeds to step S53, and the system is set to use the image processing unit 19 in the printing process. Then, the printing process at steps S54 through S56 is executed.

That is, at step S54, a determination is made as to whether or not it has been instructed to interrupt the printing process. When no interruption has been instructed, the printing process for a prescribed unit is carried out at step S55. In this case, the rotation process is executed by the image processing unit 19, the rotated image is forwarded to the printing unit 18 and printed out onto a paper. As a prescribed unit, for example, one page or several pages can be made as the prescribed unit. Moreover, when a duplex printing process has been carried out, for example, the prescribed unit can be until the image has been printed onto both sides of the paper. Of course, there are cases where a part of the image is smaller than the prescribed unit in relation to a number of pages.

After the image has been printed out for the prescribed unit, at step S56, a determination is made as to whether or not there is an unprinted image remaining. When there is an unprinted image remaining, the process returns to step S54. Then, after the printing process for all images that are to be printed has been completed, the printing process ends.

During the printing process, when an instruction is made to interrupt the printing process at step S35 of FIG. 3 or at step S43 of FIG. 4, after the printing process has been carried out for the prescribed unit at step S55, the process returns to step S54 and the process goes on standby. As a result, at step S42 of FIG. 4, the printing process is determined to be executed, and at step S44 of FIG. 4, the completion of the interruption of the printing process is detected. As a result, the scanning process accompanying the rotation process executes preferentially.

When not accompanying the rotation process, the process proceeds from step S51 to step S54, and the printing process executes at steps S54 through S56 without carrying out the rotation process. That is, at step S54, a determination is made as to whether or not it has been instructed to interrupt the printing process. When no instruction is made to interrupt the printing process, at step S55, the printing process is carried out for a prescribed unit. Further, when not accompanying the rotation process, since the rotation process function of the image processing unit 19 is available, the process proceeds from step S54 to step S55 without being interrupted from the scanning process shown in FIGS. 3 and 4. Of course, at step S55, the printing process is carried out without carrying out the rotation process. After carrying out the printing process for the prescribed unit, at step S56, a determination is made as to whether or not there is an unprinted image remaining. When there is an unprinted image remaining, the process returns to step S54. Then, when the printing process for all images that are to be printed out has been completed, the printing process ends.

Further, regarding the function for carrying out the scanning process accompanying the rotation process in preference to the printing process accompanying the rotation process, a setting can be made for whether or not to use the function. Moreover, in the above-described example, the scanning process is carried out preferentially when accompanying the rotation process in the facsimile transmission. Another function that uses the scanning process can be carried out in preference to the printing process. In this case, when it is possible to set whether or not to carry out the scanning process preferentially, the scanning process can be set to carry out the scanning process entirely preferential, or it can be set whether or not to prioritize according to each function which uses the scanning process.

What is claimed is:

1. An original document image scanning and printing device comprising:

means for scanning an image of an original document;

means for printing out the image;

means for rotating the image;

means for determining whether it is necessary to rotate the scanned image by referencing a rotational transmission table; and means for controlling to carry out rotating and scanning the image in preference to rotating and printing the image when it is necessary to rotate the image scanned by the means for scanning.

2. The original document image scanning and printing device according to claim 1, wherein when there is a request for scanning the image of the original document, during a duplex printing process by the means for printing, the means for controlling interrupts printing out the image after printing onto both sides of a paper, and preferentially executes rotating and scanning the image by the means for scanning and the means for rotating on the scanned image.

3. The original document image scanning and printing device according to claim 1, wherein the means for controlling determines whether or not it is necessary to rotate the image scanned by the means for scanning in size of the original document.

4. The original document image scanning and printing device according to claim 2, wherein the means for controlling determines whether or not it is necessary to rotate the image scanned by the means for scanning in accordance with a size of the original document.

5. The original document image scanning and printing device according to claim 3, further comprising a rotational transmission table to determine whether it is necessary to rotate the image scanned by the means for scanning.

6. The original document image scanning and printing device according to claim 1, further comprising means for storing the image of the original document.

7. The original document image scanning and printing device according to claim 6, wherein the means for storing stores the rotational transmission table.

8. The original document image scanning and printing device according to claim 1, further comprising a means for displaying image information.

9. An original document image scanning and printing device comprising:

a scanning unit that scans an image of an original document;

a printing unit that prints out the image;

an image processing unit that rotates the image;

a rotational transmission table having information that indicates whether or not to rotate the image; and a control unit that controls rotating and scanning the image in preference to rotating and printing the image when it is necessary to rotate the image scanned by the scanning unit, wherein the control unit references the rotational transmission table and determines whether or not it is necessary to rotate the scanned image.

10. The original document image scanning and printing device according to claim 9, wherein when there is a request for rotating and scanning the image of the original document during a duplex printing process by the printing unit, the control unit interrupts printing out the image after printing onto both sides of a paper and preferentially executes rotating and scanning the image by the scanning unit and the image processing unit.

11. The original document image scanning and printing device according to claim 9, wherein the control unit determines whether or not it is necessary to rotate the image scanned by the scanning unit in accordance with a size of the original document.

12. The original document image scanning and printing device according to claim 10, wherein the control unit determines whether or not it is necessary to rotate the image scanned by the scanning unit in accordance with a size of the original document.

13. The original document image scanning and printing device according to claim 9, further comprising a storage unit the stores the image of the original document.

14. The original document image scanning and printing device according to claim 13, wherein the storage unit stores the rotational transmission table.

15. The original document image scanning and printing device according to claim 9, further comprising a display unit to display image information.

16. A method for scanning and printing an original document image comprising:

scanning an image of an original document;

printing out the image;

rotating the image;

referencing a rotational transmission table;

determining whether it is necessary to rotate the scanned image based, at least in part, on information in the rotational transmission table; and controlling rotating and scanning the image in preference to rotating and printing the image when it is necessary to rotate the image.

17. The method for scanning and printing an original document image according to claim 16 further comprising determining whether or not it is necessary to rotate the image in accordance with a size of the original document.

* * * * *